June 9, 1936.  O. BRUPBACHER  2,043,577
ROOF FOR MOTOR CARS AND OTHER VEHICLES
Filed Aug. 20, 1931  6 Sheets-Sheet 1

Inventor:
Otto Brupbacher

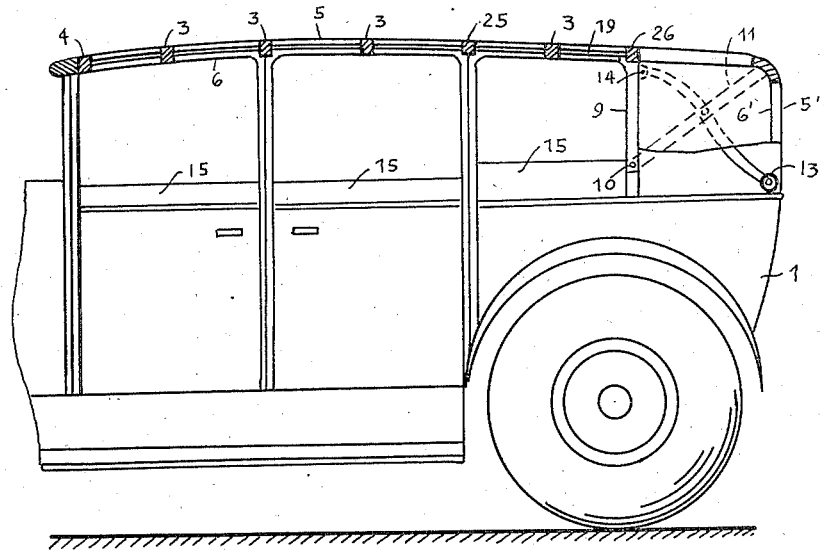
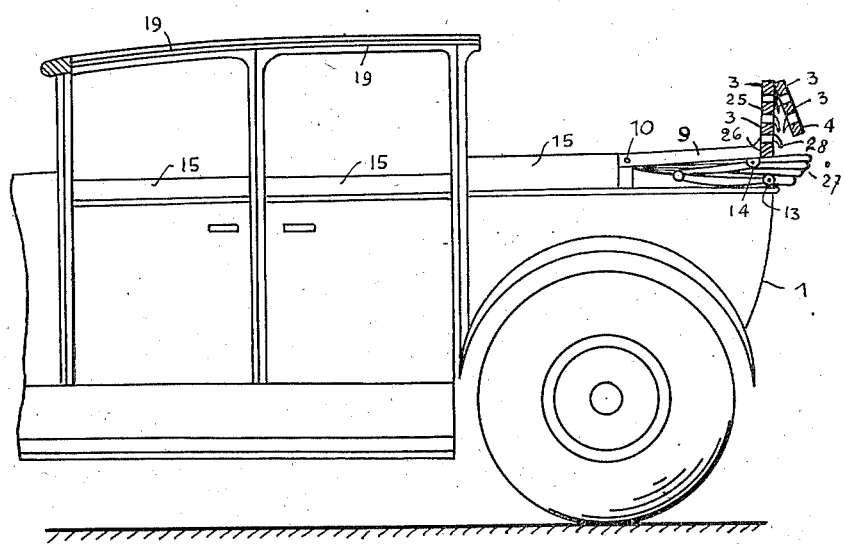

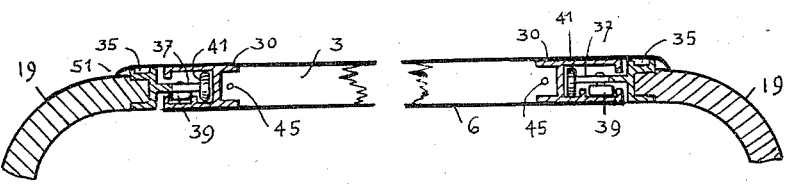
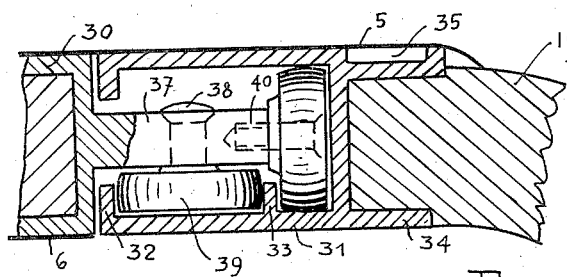
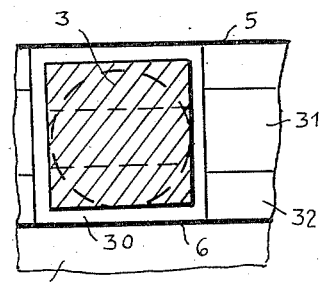
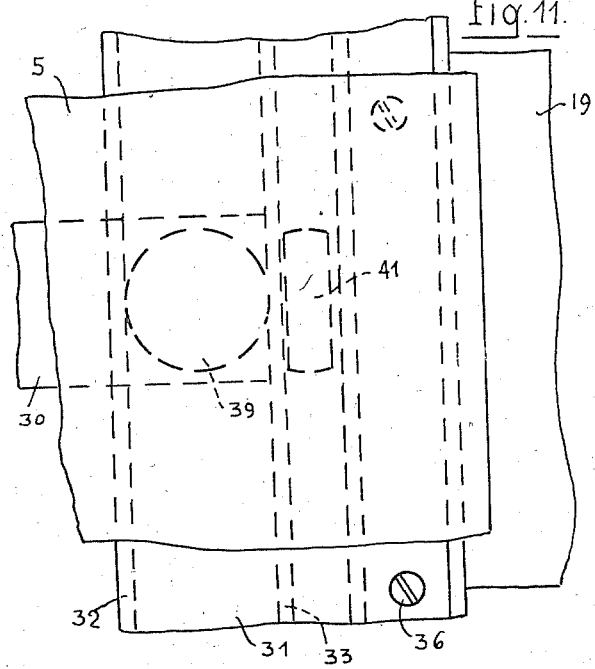
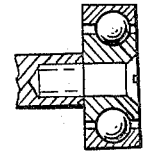

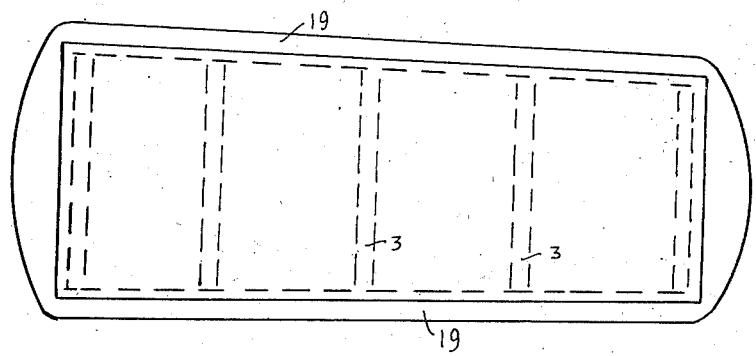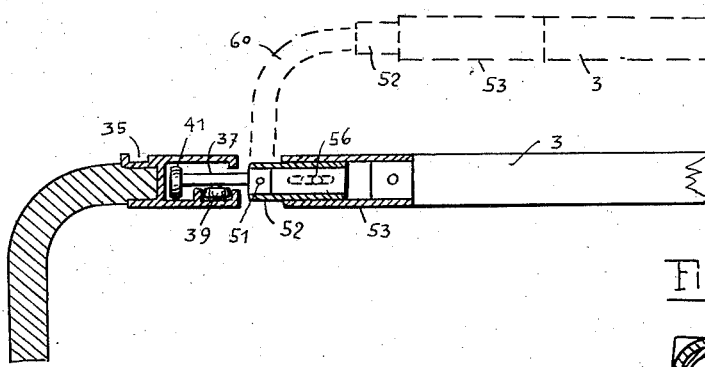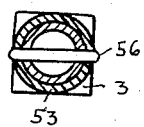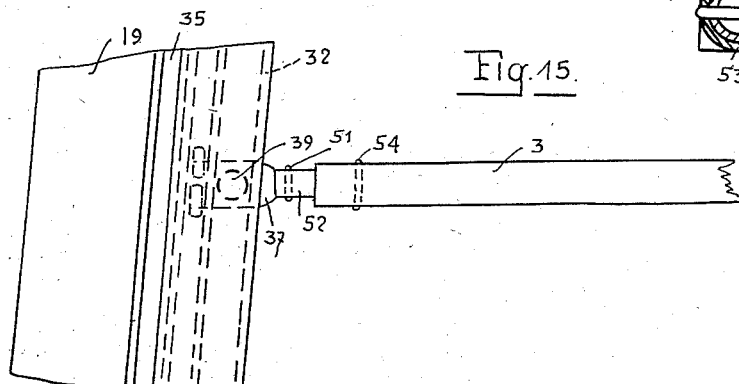

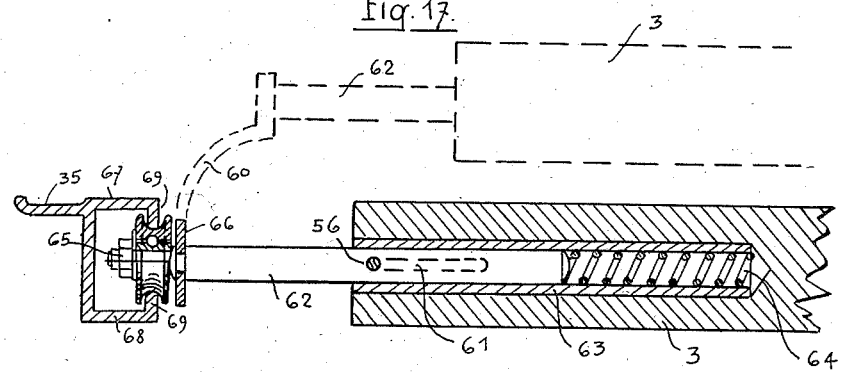
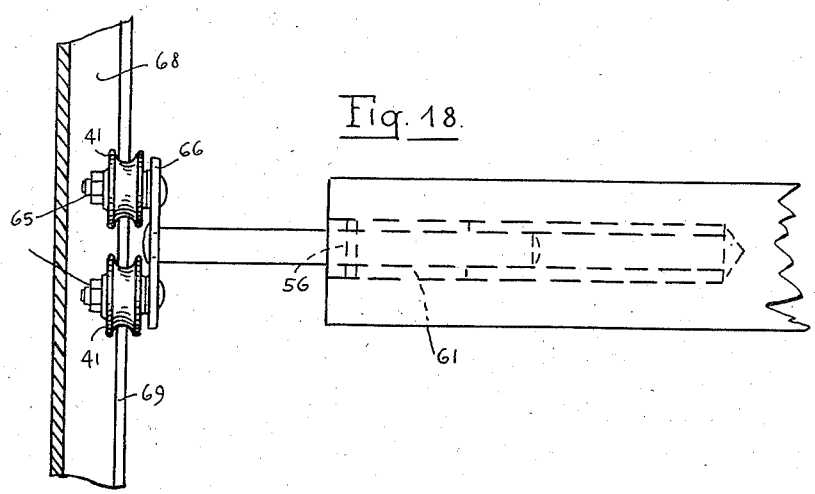
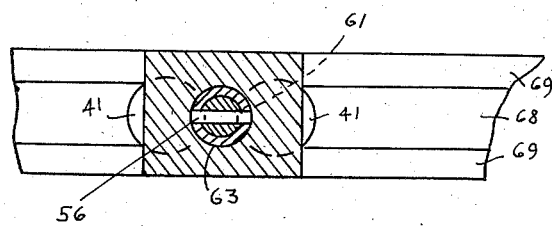

June 9, 1936.   O. BRUPBACHER   2,043,577
ROOF FOR MOTOR CARS AND OTHER VEHICLES
Filed Aug. 20, 1931   6 Sheets-Sheet 6

Patented June 9, 1936

2,043,577

UNITED STATES PATENT OFFICE 2,043,577

ROOF FOR MOTOR CARS AND OTHER VEHICLES

Otto Brupbacher, Lucerne, Switzerland

Application August 20, 1931, Serial No. 558,290
In Switzerland June 26, 1930

4 Claims. (Cl. 296—105)

This invention relates to vehicle bodies and has special reference to a vehicle body roof which may be opened and closed.

One important object of the invention is to provide an improved vehicle body wherein the roof consists of front and rear sections independently operable to open and close.

A second important object of the invention is to provide, in such a roof, a forward section which may be opened either from the rear forwardly or from the front rearwardly as desired.

A third important object of the invention is to provide a roof of this class wherein the rear portion is supported by folding struts at the opposite sides of the body, these struts being so connected that the operation of one effects operation of the other.

A fourth important object of the invention is to provide a novel roof of this class wherein the rear portion has its frame hinged to permit the forward end of such rear portion being doubled back behind the remainder of the roof to decrease the upward projection of the roof when open.

A fifth important object of the invention is to provide a novel construction of such roof wherein the forward portion of the fabric or other roofing material is supported on transverse purlins slidable longitudinally of the body to move toward and from each other.

A sixth important object of the invention is to provide novel means on the rear section of the roof to receive the above mentioned purlins whereby the entire roof may be opened as a unit.

A seventh important object of the invention is to provide a novel construction of such a roof wherein the aforesaid purlins are provided with rollers, either plain or ball bearing, which run in suitable guides and facilitate the opening and closing of the portion of the roof including said purlins.

An eighth important object of the invention is to provide a novel construction of such a roof wherein provision is made for preventing leakage and rendering the roof waterproof.

A ninth important object of the invention is to provide a novel extensible and collapsible purlin construction for such a roof whereby differences in the width of the body frame will be accommodated and thus the roof may be used on cars having a tapering body.

A tenth important object of the invention is to provide a novel spring arrangement in such purlins whereby the centers of the purlins will be maintained on the center line of the roof.

An eleventh important object of the invention is to provide an improved and novel roller and guide arrangement for the purlins.

A twelfth important object of the invention is to provide a novel arrangement of means for causing proper folding of the roof covering.

With the foregoing and other objects in view, the invention consists in the details of construction and in the arrangement and combination of parts to be hereinafter more fully set forth and claimed.

In describing the invention in detail, reference will be had to the accompanying drawings forming part of this application, wherein like characters denote corresponding parts in the several views, and in which—

Figure 6 illustrates a view similar to Figure 1 but showing a modification of the roof arrangement in its closed position;

Figure 7 illustrates a view similar to Figure 6 but with the roof open;

Figure 8 illustrates an enlarged transverse section of the forward portion of a modified form of the roof employing roller provided cross-bars or purlins and showing the guides therefor;

Figure 9 illustrates an enlarged detail section of the parts at one end of Figure 8;

Figure 10 illustrates an enlarged detail section on the line C—C of Figure 8;

Figure 11 illustrates a detail plan view of portions of the parts shown in Figure 9;

Figure 12 illustrates a section through a ball bearing roller suitable for use herein;

Figure 13 illustrates a plan view showing in diagram a tapered vehicle body;

Figure 14 illustrates a section somewhat similar to Figure 8 but on an enlarged scale and showing a modified arrangement suitable for use with a tapered body;

Figure 15 illustrates a plan view of the parts shown in Figure 14;

Figure 16 illustrates a section on the line 16—16 of Figure 14;

Figure 17 illustrates a view similar to Figure 14 but showing a further modification of the construction;

Figure 18 illustrates a plan view of the modification shown in Figure 17;

Figure 19 illustrates a section on the line 19—19 of Figure 17;

Figure 1:
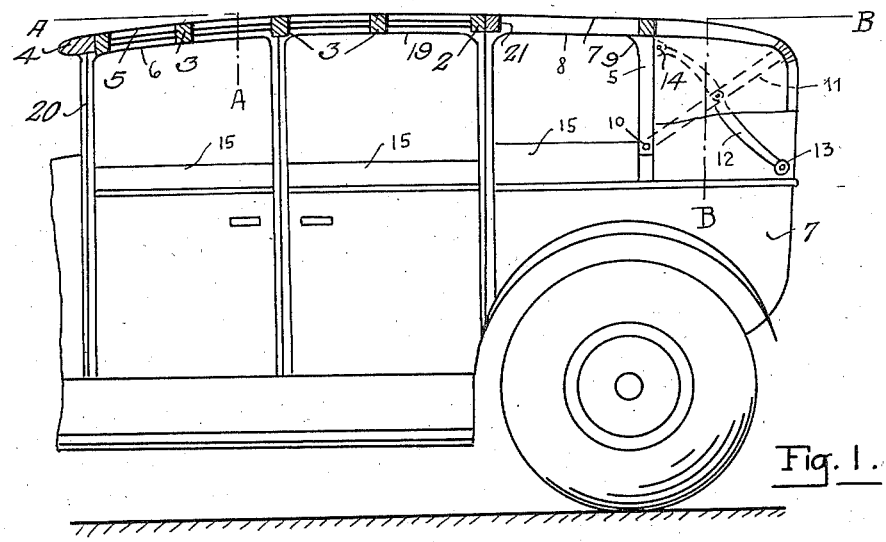
Figure 1 illustrates a side elevation partly in longitudinal section and showing one form of the invention with the roof closed.
Figure 2:
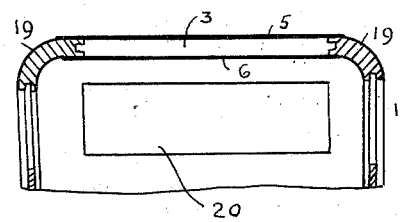
Figure 2 illustrates a detail section on the line A—A of Figure 1.
Figure 3:
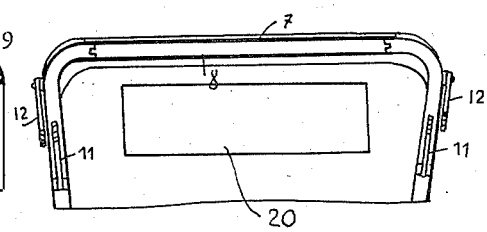
Figure 3 illustrates a detail section on the line B—B of Figure 1.

In the invention as herein disclosed, in Figures 1 to 7, the roof has been shown as applied to an automobile 1 and the body of this automobile has, at its forward portion, certain fixed frame posts 1a which have their upper ends connected at each side of the body by a stringer 1b. These stringers are of the common quarter-circle shape in cross-section and their confronting edges are parallel and are provided with guide grooves 19 wherein are slidably mounted tongues 19' formed on the ends of cross-bars or purlins 3 extending transversely of the roof and spanning the space between said longitudinal members. The forward purlin lies, with the roof closed, against a lintel 4 extending between the forward posts 1a and over the wind-shield 20. The rear purlin 3 lies, with the roof closed, at the rear ends of the members 1b. Secured to the upper faces of the purlins 3 is a roof covering 5 and to the under faces of these purlins is secured the lining 6.

In the form shown in Figures 1 to 5, the covering 5 and lining 6 terminate rearwardly at the rear purlin 3 so that the front portion of the roof is entirely disconnected from the rear so far as its operativeness is concerned. Under these conditions, the rear purlin may be moved forwardly toward the front purlin and, as it moves, pushes the intermediate purlins before it to cause all the purlins to be assembled at the front as in Figure 4. Conversely, the front purlin may be pushed back to assemble all purlins at the rear. Thus the forward part of the roof may be opened from the rear forwardly or from the front rearwardly, the roof covering and lining forming a series of pleats in each case.

In the forms shown in Figures 1 to 7, the rear part of the body is provided with short posts 9' carrying pivots 10 at their upper ends and on these pivots are mounted vertical posts 9 having stringers 9a extending forwardly from their upper ends connected forwardly by a purlin 21. Also pivoted at 10 are the legs of a rear bow 11 which serves to hold the upper rear part of the roof properly supported when the roof is closed. A shaft 13 extends across the body at the rear thereof and fixed to each end of this shaft is an arm 12 having its free end pivotally connected to one end of a link 12a which has its remaining end pivoted to a bracket 14 fixed to the upper part of the post 9. Thus the parts 12 and 12a form the usual folding strut but, because both members 12 are fixed to the shaft 13, folding or unfolding of one strut will cause the same movement in the other.

Figure 4:
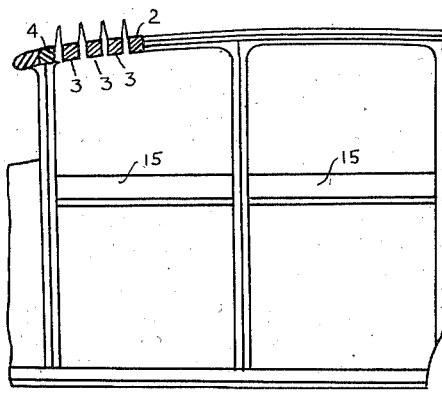
Figure 4 illustrates a view similar to Figure 1 but showing both parts of the roof open.
Figure 5:
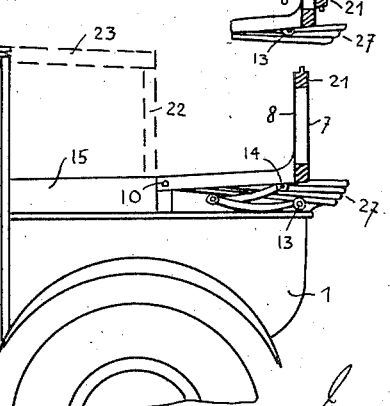
Figure 5 illustrates a detail view showing a slight modification of certain parts shown in Figure 4.
Figure 20:
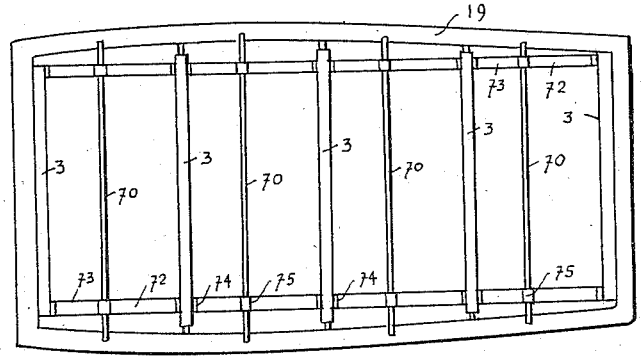
Figure 20 illustrates a plan view of the framing of a roof wherein certain fold controlling members are employed.
Figure 21:
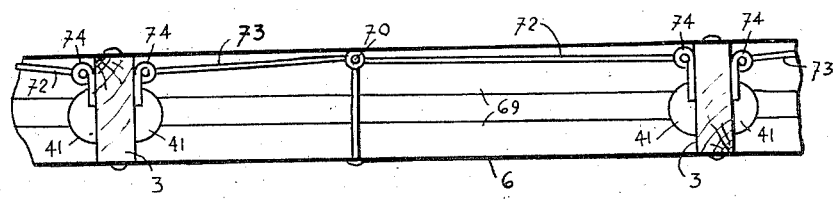
Figure 21 illustrates an enlarged detail section on the line 21—21 of Figure 20.
Figure 22:
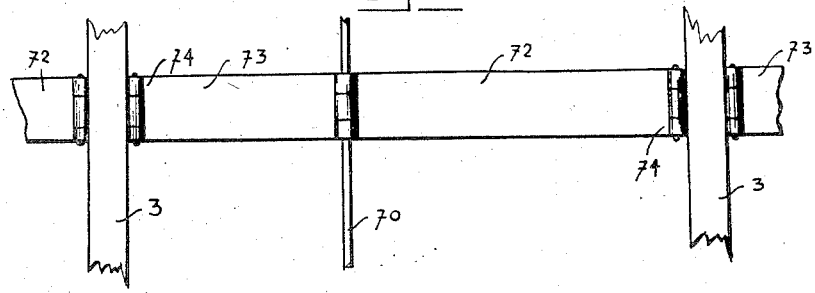
Figure 22 illustrates a detail plan view of the framing as shown in Figure 21.
Figure 23:
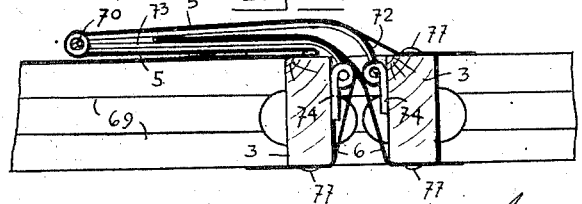
Figure 23 illustrates a view similar to Figure 21 but with the parts in open roof position.

In the form shown in Figures 1 to 5, this part of the body is provided with the roof covering 7 and a lining 8 which are independent of the covering 5 and lining 6 so that the rear part of the body may be opened without opening the forward part, the forward part alone may be opened or both may be opened, the rear parts when opened taking the position shown in Figure 4. If, however, it is desired to reduce the height to which the stringers 9a project in open position, these stringers may be hinged, as shown in Figure 5 at 24, so that the upper parts may fold back behind the lower parts. In this form, arrangement may be made to leave a window post 23 and lintel 24 standing to accommodate the rear window 15.

In the form shown in Figures 6 and 7, the members 9a are replaced by members 25 having grooves 26 which form continuations of the grooves 19, the purlin 21 being omitted and certain additional purlins 3 being used on the rear folding section. In this form, the covering 5 is continued rearwardly as at 5' and similarly the lining 6 is continued rearwardly as at 6'. Preferably hinges 30 are provided in the members 25. With this construction the roof is opened only from the front, all the purlins being pushed back to lie between the stringers 25. The back is then folded as in the first form, this part of the construction being the same.

In Figures 8 to 12 is shown a modified form of purlin and stringer arrangement. In this form, the edge of each stringer 19 has a channel member 34 fitted thereon and extending inwardly from this channel are flanges 31 forming an inwardly opening channel. The flanges 31 have their inner edges directed toward each other as at 31a and on the bottom flange is a rib 33. On each end of the purlin 3 there is fitted a cuff 39a wherefrom projects a flat tongue 37 which extends between the parts 31a. A stub shaft 40 is screwed into the end of the tongue and carries a roller 41. Also a vertical stub shaft 38 is fixed to the tongue to project downwardly therefrom and carry a roller 39. The roller 39 works between the lower flange edge 31a and the rib 33 while the roller 41 works between the flanges 31. Thus the purlin end is supported against movement transversely or vertically with respect to the vehicle body while the rollers allow free movement along the stringers 19. In this form, the covering material 5a is carried out over a drain channel 35, formed in the upper flange of the channel 34, and rests at 51 on the stringer 19 to form a waterproof joint.

A modified form of roller is shown in Figure 12 wherein the roller has a hub 49 forming an inner race for balls 50 on which runs an outer race 51 forming the wheel rim.

In the form shown in Figures 13 to 16, the channels on the stringers are identical with those just described, but the arrangement at the purlin ends is somewhat different since, as shown in Figure 13, the stringers 19 are not parallel. In this form, at each end of the purlin 3 there is mounted a sleeve 53 which is secured by a pin 54. In this sleeve is fitted a sliding cuff 52, the movement of which is limited by a pin and slot connection 56 between the sleeve and cuff. In the outer end of the cuff a plug 50b is secured by a pin 51b and this plug carries the tongue 37 previously described. Preferably two rollers 41 are carried by this tongue. By this means, as the distance between the members 19 is greater or smaller, the sliding of the cuffs affords adjustment of the lengths of the purlins to conform thereto.

In the form shown in Figures 17 to 19, the stringers carry a C-channel having the usual drain channel 35. Each purlin has at each end a bore wherein is fitted a sleeve 63 having a rod 62 slidably fitted in its outer end and urged outwardly by a spring 64, the movement being limited by the pin and slot connection 56 and 61. A plate 66 is carried on the outer end of the rod 62 and supports stub shafts 65 whereon are mounted grooved rollers 41c which travel on the edge portions 69 of the channel. This form, it will be noted, may be used with either parallel or converging stringers.

In Figures 14 and 17, the dotted lines indicate the manner in which the roof may be arched upwardly.

Figures 20 to 23 show the manner of controlling the folding of the top material. As these show, the purlins 3 support hinge brackets 74 adjacent the purlin ends. The brackets on the confronting sides of adjacent purlins are connected by the links 72 and 73 which have their proximal ends pivoted on a rod 70 which extends from side to side of the top under the covering 5. Tie members 71 connect this rod with the lining 6. Normally, the links 72 and 73 incline upwardly from their respective brackets and thus the rod 70 tends to be forced upwardly as the purlins are moved toward each other. However, the links 73 are shorter than the links 72 so that when the purlins are in their proximal positions the pleats formed do not project straight up but assume the position shown in Figure 23. Obviously this pleat forming arrangement can be used in connection with any of the forms shown in Figures 1 to 19.

I claim:

1. In a vehicle roof, a pair of side stringers having confronting faces provided with guide channels, a plurality of purlins extending between said stringers and provided with guide means cooperating with said channels, a plurality of pairs of links connecting adjacent purlins adjacent the ends thereof and having a rod extending parallel to the purlins to form a pivot common to said links, and a roof covering attached to said purlins and overlying said links and rod, the links attached to one of the connected purlins being shorter than the links connected to the adjacent purlin.

2. In a vehicle roof, a pair of side stringers having confronting faces provided with guide channels, a plurality of purlins extending between said stringers and provided with guide means cooperating with said channels, a plurality of pairs of links connecting adjacent purlins adjacent the ends thereof and having a rod extending parallel to the purlins to form a pivot common to said links, a roof covering attached to said purlins and overlying said links and rod, the links attached to one of the connected purlins being shorter than the links connected to the adjacent purlin, a roof lining carried by the under side of said purlins, and ties connecting said lining with said rod.

3. The combination with a pair of stringers, each of channel shape and open on their confronting sides, each of said stringers having an upper and a lower flange provided with opposed projecting ribs, of a purlin extending between said stringers and provided at each end with a socket, a plunger slidable in each socket, a compression spring in each socket and bearing on the respective plunger to urge it outwardly, stop means connecting each plunger and purlin to limit outward movement of the plunger, a carrier plate fixed to the outer end of the plunger and extending parallel to the stringer, and a grooved wheel rotatably mounted on the carrier plate and having the ribs of the corresponding stringer engaging in its groove.

4. In combination a pair of stringers, each with guide channels therein open on their confronting sides and including an upper and a lower flange provided with opposed projecting ribs, a plurality of purlins, a roof covering carried by said purlins, the group of purlins comprising main purlins and auxiliary purlins, hinged means of unequal length connecting the auxiliary purlins with the main purlins, said means being so arranged that the auxiliary purlins cannot be lower than the main purlins and all of the purlins being so interconnected by said means and so attached to the roof covering that when they are slid together between said stringers said roof covering will be laid in a definite number of folds, said stringers being provided with gutters extending outwardly therefrom and having flanges at their free ends to prevent passage of water beneath said roof covering, each purlin being provided with a socket at its outer end, a plunger slidable in each such socket, a helical spring in each socket and bearing on the respective plunger to urge it outwardly so that the purlin will be held in mid-position between said stringers and said roof covering may be moved in a straight line between said stringers regardless of whether the latter are parallel, stop means connecting each plunger and the purlin in which it is mounted to limit outward movement of the plunger, a carrier plate fixed to the outer end of each plunger and extending parallel to the corresponding stringer, and grooved rollers rotatably mounted on the carrier plate and having the ribs of the guide channel of the corresponding stringer engaging in the groove of each roller.

OTTO BRUPBACHER.